Feb. 4, 1947.   F. J. BARTECK ET AL   2,415,077
THREADING BAR
Filed Aug. 14, 1944   2 Sheets-Sheet 1

Inventors
Francis J. Barteck & Norman M. Gibson.

By W Glenn Jones
Attorney

Feb. 4, 1947. F. J. BARTECK ET AL 2,415,077
THREADING BAR
Filed Aug. 14, 1944 2 Sheets-Sheet 2
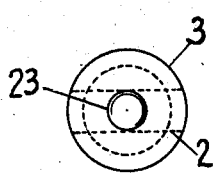
FIG. 6
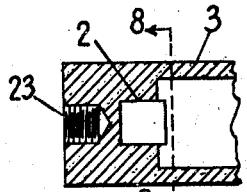
FIG. 7
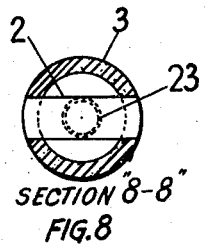
SECTION "8-8"
FIG. 8
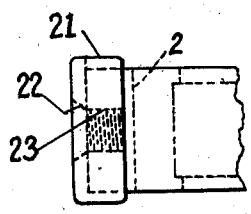
FIG. 11
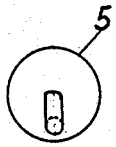
FIG. 12
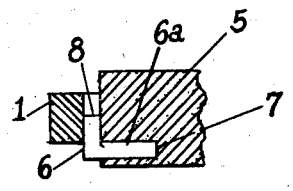
FIG. 13
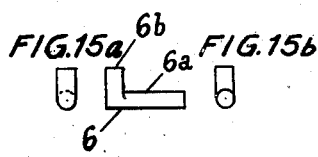
FIG. 15a  FIG. 15b
FIG. 15
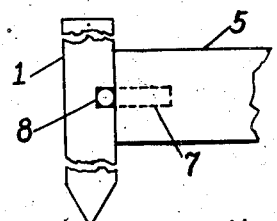
FIG. 14
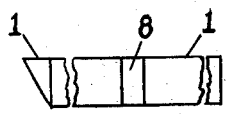
FIG. 16
Inventors
Francis J. Barteck & Norman M. Gibson.
By W. Glenn Jones
Attorney Patented Feb. 4, 1947

2,415,077

UNITED STATES PATENT OFFICE 2,415,077

THREADING BAR

Francis J. Barteck and Norman M. Gibson,
United States Navy

Application August 14, 1944, Serial No. 549,476

8 Claims. (Cl. 10—101)

(Granted under the act of March 3, 1883, as amended April 30, 1928; 370 O. G. 757)

This invention relates to improvements in threading and boring bars.

An object of the invention is to provide a threading and boring bar construction which is capable of threading and boring in small holes.

Another object is to provide a threading and boring bar which is of sturdy construction though designed for use in small holes in the work.

A further object is the provision of a threading and boring bar which is of simple construction while providing for maximum ease of adjustment and control.

A still further object of the invention is to provide a threading bar in which different sizes of threads can be cut with the same cutting tool, which tool can be resharpened a number of times before it is discarded and which is readily replaceable in the threading bar.

An important feature of the invention is the provision of novel means for advancement and retraction of the cutting tool in respect to the boring and threading bar, upon rotary adjustment of a portion of the bar.

Another feature is the provision of releasable means for locking an inner member of the bar in engagement with the cutting tool of the bar against movement of either.

Still another feature of the invention is the provision of means for retracting an inner member of the bar for disconnection of connecting means between the member and the cutting tool, for removal and replacement of the cutting tool.

Other objects and features of the invention will be apparent from the following description in connection with the accompanying drawings showing an exemplary embodiment of the invention.

In the drawings:

Fig. 6 is an end view of the outer bar.

Fig. 7 is a fragmentary longitudinal section of the outer bar.

Fig. 8 is a transverse sectional view of the outer bar on line 8—8 of Fig. 7.

Fig. 11 is a view of the collar attached to the end of the outer bar.

Fig. 12 is a view showing the connecting pin in place in the end of the inner bar.

Fig. 13 is a fragmentary sectional view showing the connecting pin received in the hole in the inner bar and in the slot in the cutting tool, other parts being omitted.

Fig. 14 is a fragmentary top plan view of the connection shown in Fig. 13, other parts being omitted.

Figure 1:
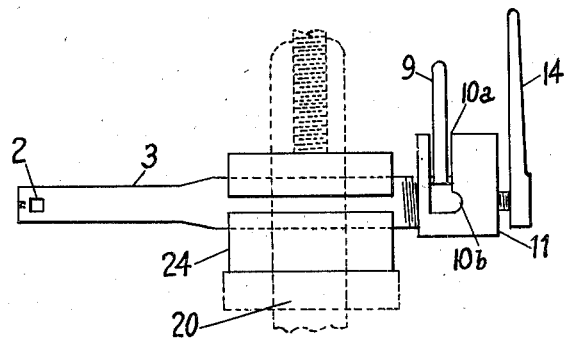
Fig. 1 is a side elevation of a threading and boring bar mounted on a lathe tool post.
Figure 2:
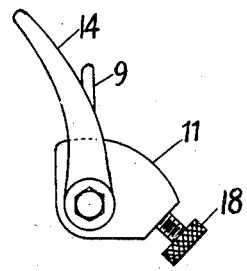
Fig. 2 is an end view thereof.

Figs. 15, 15a, and 15b show the pin in side and end views, and Fig. 16 shows the tool.

The threading and boring bar of the present invention is designed primarily for threading work where the hole in the work is small in comparison to the boring tool necessary to cut a thread in such a hole, as for instance, when cutting internal threads of the acme or square types in a small hole. The difficulty usually encountered in such instances is that the boring bar and the tool point together are too large to be inserted in the hole.

The usual method of doing such work is to use a tab if available, or to grind down the shank and tool point of a forged bar until it can be set into the hole to be threaded. This generally results in the shank being so weakened that a poor thread results, even disregarding the time, labor, and difficulty of dressing a tool in such a manner. Further, with very slight wear such a forged tool must be discarded as there is no material remaining on which to regrind the threading point. Also, regarding taps, even if one is available, these are very liable to breakage in place particularly if the thread is of the acme or square thread type. In both instances, using a tap or using a forged tool, only one particular size of thread can be cut, whereas with the bar of the present invention, cutter bits properly ground are inserted in the bar to cut any thread within its range. As the cutter bit wears it can be resharpened a number of times before it is ready for discarding when a new cutter bit can be inserted in its place.

This threading bar carries a replaceable and retractable tool bit, making it possible to insert it for threading work into much smaller holes than any of the bars heretofore in use.

Referring to the drawings, the numeral 1 represents the cutting tool which is slidably received in the transverse opening or socket 2 of the outer bar member 3 of the threading and boring bar. The cutting tool and socket are preferably square or rectangular in cross section. The outer bar member 3 is of tubular form and is desirably closed at its outer end as shown. The circular bore 4 of the outer bar member 3 communicates with the transverse opening or socket 2, and at this point the socket is of smaller dimension than the tool 1 so that the side of the tool projects into the bore 4 of the outer bar member as seen in Fig. 3.

Figure 3:
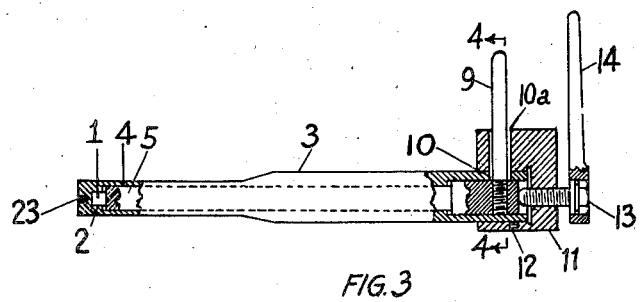
Fig. 3 is a side elevation, partly in section, of a threading and boring bar.

The numeral 5 represents the inner bar member which is slidably and rotatably received in a close fit in the bore 4 of the outer bar member 3, and the end of which engages directly against the side surface of the tool 1, as shown in Fig. 3, to hold the tool in adjusted position.

An effective and positive connecting means for laterally advancing and retracting the cutting tool upon rotation of the inner bar 5 within the outer bar, is provided according to the invention. This comprises a pin or finger member 6 having a portion received in a recess in the inner bar and a portion received in a socket in the cutting tool.

In the embodiment shown, the pin 6 has arm portions 6a and 6b substantially at right angles to each other. The end of the inner bar is provided with a circular hole 7 disposed at a point radially spaced from the longitudinal axis of the inner bar and desirably disposed near to the circumference of the inner bar. This is shown in Figs. 5, 5a, 12 and 13. The arm 6a of the finger or pin is received in the hole 7.

The other arm 6b of the finger or pin 6 is received within a slot or recess 8 in the side face of the tool 1, extending transversely thereof, as seen in Figs. 13 and 14.

Upon rotary movement of the inner bar 5, the pin or finger being constrained to movement in the hole 7 of the inner bar and in the slot 8 in the side of the tool 1 will transmit the rotary motion of the bar to the tool 1, to laterally advance or retract the tool. This is accomplished by reason of the fact that relative rotation takes place between the arm 6a of the pin and its circular hole 7 in the inner bar, and relative sliding movement takes place between the arm 6b of the pin and the transverse slot 8 in the side of the tool 1. The rotary motion of the inner bar 5 is thereby translated into linear motion of the tool 1. As the inner bar rotates, it carries the arm 6a of the pin with it, with relative rotation between these parts, which enables the arm 6b of the pin to keep its alignment in the slot 8 of the tool while sliding in said slot, and carrying the tool bit laterally of the bar.

Means for rotating said inner bar 5 are provided, comprising a lever arm 9 secured to the inner bar in any suitable manner, as by means of screw threads, as shown. A lateral slot 10 is provided in the outer bar through which the inner bar lever arm 9 extends and is moved in imparting rotation to the inner bar 5.

The outer bar 3 is provided with a closed end or head which may desirably be in the form of a head block 11 receiving the end of the outer bar and secured thereto by a set screw 12 or the like, and having a lateral slot 10a in alignment with the slot 10 of the outer bar.

The lateral slots 10 and 10a are disposed in part of sufficiently greater width than the lever arm 9, as indicated at 10b as to permit of retraction of the inner bar to disconnect the pin by withdrawing the pin from the slot in the tool 1, enabling removal or replacement of the cutting tool or bit. To accomplish this, it is only necessary to retract the locking screw a turn or two, and then move the inner bar with its lever 9 in the wide slot portion 10b to retract the inner bar enough to permit removal of the cutting tool by disconnecting the pin therefrom.

When the device is in the position indicated in the drawings, with the inner bar lever 9 in a vertical position and the pin 6 and hole 7 in a central position, then the tool is in an intermediate position between fully retracted position and fully advanced position. To fully retract the tool, the inner bar lever 9 is moved adjacent the widened slot portion 10b. To advance the tool, the lever 9 is moved in the opposite direction. The inner bar 5 and its lever 9 are capable of a maximum rotary movement in respect to the outer bar 3, of approximately 180 degrees, from full retraction of the cutting tool to full advancement thereof.

Means are provided for locking the inner bar in adjusted position with its end bearing against and locking the tool in adjusted position, and comprise a locking screw 13 threaded through the head block 11 of the outer bar member and entering the bore of the tubular outer bar and engaging the end of the inner bar member 5 to cause it to bear in turn upon the tool 1 as shown in Fig. 3. This locks the inner bar and tool in adjusted position at the inward position of the locking screw. In the adjusted and locked position of these parts, the threading and boring bar and its tool are in condition for cutting the thread or bore. There is no strain on the pin connection between the tool and inner bar in the locked or cutting condition of the parts, since the inner bar is locked against the cutting tool. The only strain borne by the pin connection is the slight force which it transmits to move the tool upon rotary movement of the inner bar after release of the locking screw. The inner bar is adjusted for movement of the cutting bit or tool only when the locking screw 13 is in retracted or unlocked position.

Figures 9, 10:
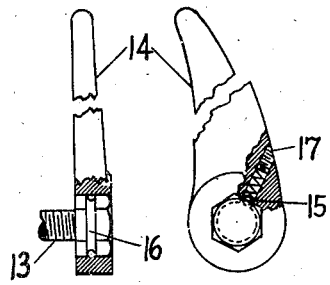
Figs. 9 and 10 are detail views of the locking screw and arm.

The locking screw is preferably provided with a handle or arm 14 for manipulating the screw. The handle arm may desirably be formed to fit over the angular head of the locking screw as indicated in Figs. 9 and 10, and may be removably retained thereon by means of a spring pressed ball detent 15 received in a groove or ball recess 16 formed in the head of the screw. A set screw 17 retains the spring pressed ball 15.

Figure 4:
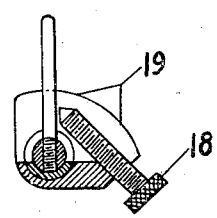
Fig. 4 is a sectional view on line 4—4 of Fig. 3.
Figure 5A:
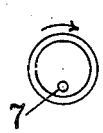
Fig. 5a is an end view of the inner bar.
Figure 5:
Fig. 5 is an enlarged side view of the inner bar.

As shown in Fig. 4, a stop screw 18 may desirably be provided, extending into the lateral slot 10 of the outer bar and preferably threaded into the walls of head 11 at either side of the slot 10. The stop screw is adjusted to bear against the lever arm 9 of the inner bar after the latter is adjusted.

Desirably the head block 11 may be provided with a graduated scale along the surface 19, to indicate positions of adjustment of the inner bar lever 9 and consequent positions of adjustment of tool 1.

The lathe tool post 20 and holder 24 in which the bar is mounted for use, are indicated in Fig. 1. The holder may be of any type designed to receive a round shank.

The end of the outer bar member 3 may desirably be provided with a guide collar 21 secured thereto by means of a screw 22 received in a threaded socket 23 in the bar end. Collars 21 of suitable size may be thus interchangeably attached to serve as a support for the bar when being fed through the work. The guide collar 21 is desirable to insure prevention of tool chatter, although the bar is of sturdy construction and would take the cutting strain without a guide collar. The elimination of possible tool chatter is a desirable feature, however.

When the bar is in use for cutting threads after the preliminary set up of the bar in the lathe tool post, the inner bar lever 9 is adjusted for desired depth of cut and the stop screw 18 is adjusted to bear against the inner bar lever at this setting. After the adjustment of the inner bar lever and the stop screw, the locking screw 13 on the extreme end is locked, and the tool is ready for cutting the threads.

After each cut of thread is run through the work, the locking screw is unlocked. A quarter turn of the locking screw is sufficient movement thereof to lock or unlock the same. The inner bar lever is then set in the position retracting the tool bit. The lathe carriage is then moved back to its original position and the stop screw is moved slightly to permit the inner bar setting for a new cut. The locking lever is again locked and this cut is fed through the work. The thread cutting is proceeded with in this manner until it is completed.

The tool bit is always placed in the retracted position when withdrawing the threading and boring bar from the work. The adjustments of the levers and stop screw may be accomplished almost instantaneously, and in cutting threads with this bar no use of the crossfeed screw or compound rest screw is necessary beyond that in the preliminary set up of the bar.

It will be understood that various changes in the construction and details of the device illustrated and described herein may be made without departing from the spirit of the invention or the scope of the appended claims.

The invention described herein may be manufactured and used by or for the Government of the United States of America for governmental purposes without the payment of any royalties thereon or therefor.

We claim:

1. A threading and boring bar comprising a tubular outer bar member, a cutting tool mounted in said outer bar, an inner bar member received within the said outer bar and engaging said tool, the said outer bar having a head portion at one end thereof, a locking screw extending through said head portion in position to engage the end of said inner bar, said outer bar having a lateral slot therein, said inner bar having a lever arm extending through said slot to impart rotary adjusting movement thereto relative to said outer bar, and connecting means between said inner bar and said tool for advancing or retracting said tool upon rotary movement of said inner bar, said connecting means comprising a pin having arms substantially at right angles to each other, the end face of said inner bar adjacent said tool having a circular hole therein radially spaced from the longitudinal axis of the inner bar and receiving one of the arms of said pin, the side face of said tool adjacent said inner bar having a transverse slot therein receiving the other arm of said pin.

2. A threading and boring bar comprising a tubular outer bar member, a cutting tool mounted for sliding movement in a transverse opening in said outer bar, an inner bar member received within the said outer bar and engaging said tool, said outer bar having a head portion at one end thereof, a locking screw extending through said head portion in position to engage the end of the inner bar to lock it against the cutting tool, said outer bar and head having a lateral slot therein, said inner bar having a lever arm extending through said slot to impart rotary adjusting movement thereto relative to said outer bar, means providing an adjustable stop for said lever arm, and connecting means between said inner bar and said tool for advancing or retracting said tool upon rotary movement of said inner bar.

3. A threading and boring bar comprising a tubular outer bar member, a cutting tool mounted for sliding movement in a transverse opening in said outer bar, an inner bar member received within said outer bar and engaging said tool, a head block having an opening receiving an end of the outer bar, means for securing said head block and outer bar together, said head block engaging the end of said outer bar, a locking screw extending through said head block in position to extend into the end of the outer bar and to engage the end of the inner bar to lock it against the cutting tool, said head block having a lateral slot therein communicating with its said opening, said outer bar having a slot therein in registry with said slot in the head block, said inner bar having a lever arm extending through said aligned slots to impart rotary adjusting movement thereto relative to said outer bar, and connecting means between said inner bar and said tool for advancing or retracting said tool upon rotary movement of said inner bar.

4. Apparatus according to claim 2 in which said means providing an adjustable stop for said lever arm comprises a stop screw mounted in said slot in the head and engaging screw threads in said head on either side of said slot.

5. A threading and boring bar comprising a tubular outer bar member, a cutting tool mounted for sliding movement in a transverse opening in said outer bar, an inner bar received within said outer bar and engaging said tool, means for rotating said inner bar within said outer bar, releasable means for locking the inner bar against said tool, the end face of said inner bar adjacent said tool having a hole therein radially spaced from the longitudinal axis of the inner bar, a pin having an arm portion received in said hole and having a transverse arm portion external of said inner bar, the side face of said tool adjacent said inner bar having a transverse slot therein, said transverse portion of the pin being received in said slot in the tool, said tool being advanced and retracted by said pin upon rotation of said inner bar.

6. A threading and boring bar comprising a tubular outer bar member, a cutting tool mounted for sliding movement in a transverse opening in said outer bar, an inner bar received within said outer bar and having an end engaging said tool, means for rotating said inner bar within said outer bar, releasable means for locking the inner bar against said tool, the end face of said inner bar having a hole therein radially spaced from the longitudinal axis of the inner bar, a pin having an arm portion received in said hole and having a transverse arm portion external of said inner bar end face, the side face of said tool adjacent said inner bar having a transverse slot therein, said transverse portion of the pin being received in said slot in the tool, said tool being advanced and retracted by said pin upon rotation of said inner bar.

7. A threading and boring bar comprising a tubular outer bar member, a cutting tool mounted for sliding movement in a transverse opening in said outer bar, an inner bar member received within said outer bar and engaging said tool, said outer bar having a head portion at one end thereof, a locking screw extending through said head portion in position to engage the end of said inner bar, said outer bar having a lateral slot therein, said inner bar having a lever arm extending through said slot to impart rotary adjusting movement thereto relative to said outer bar, and connecting means between said inner bar and said tool for advancing or retracting said tool upon rotary movement of said inner bar, said lateral slot being in part sufficiently greater in width than said lever arm to permit of longitudinal retraction of said inner bar for disconnection of said connecting means and removal and replacement of the cutting tool.

8. A threading and boring bar according to claim 2 in which said outer bar is provided with a guide collar removably secured thereto for guiding the bar through the work.

FRANCIS J. BARTECK.
NORMAN M. GIBSON.

REFERENCES CITED

The following references are of record in the file of this patent:

UNITED STATES PATENTS

| Number | Name | Date |
|---|---|---|
| 1,705,319 | Swendsen | Mar. 12, 1929 |
| 2,159,308 | Anthony | May 23, 1939 |
| 575,085 | Wiebe | Jan. 12, 1897 |
| 1,392,203 | Nelson | Sept. 27, 1921 |
| 2,293,680 | Beyreis | Aug. 18, 1942 |